Jan. 22, 1924.
S. S. WHEELER
1,481,449
APPARATUS FOR INDICATING AND EXPEDITING WORK
Filed Oct. 21, 1920
7 Sheets-Sheet 2
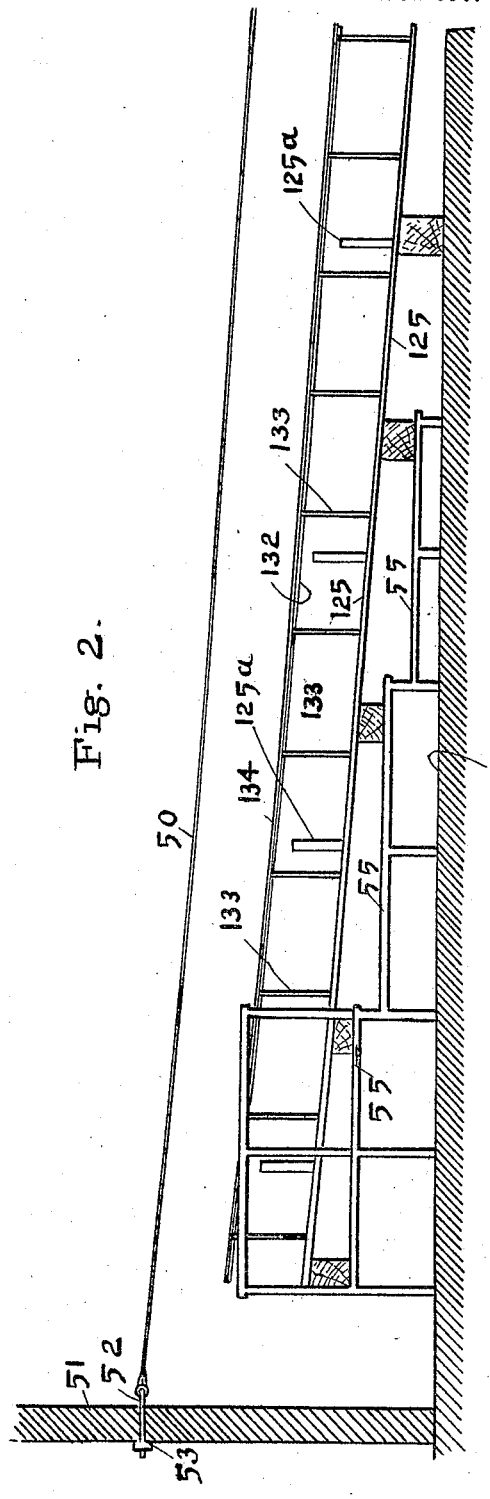
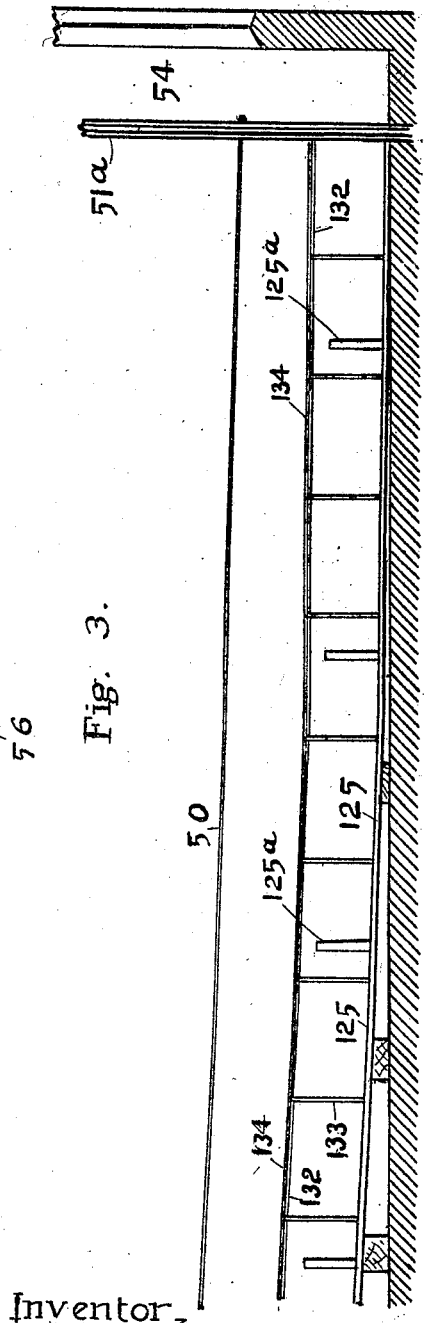
Inventor,
Schuyler S. Wheeler,
By Geo. T. Wheelock
Attorney.

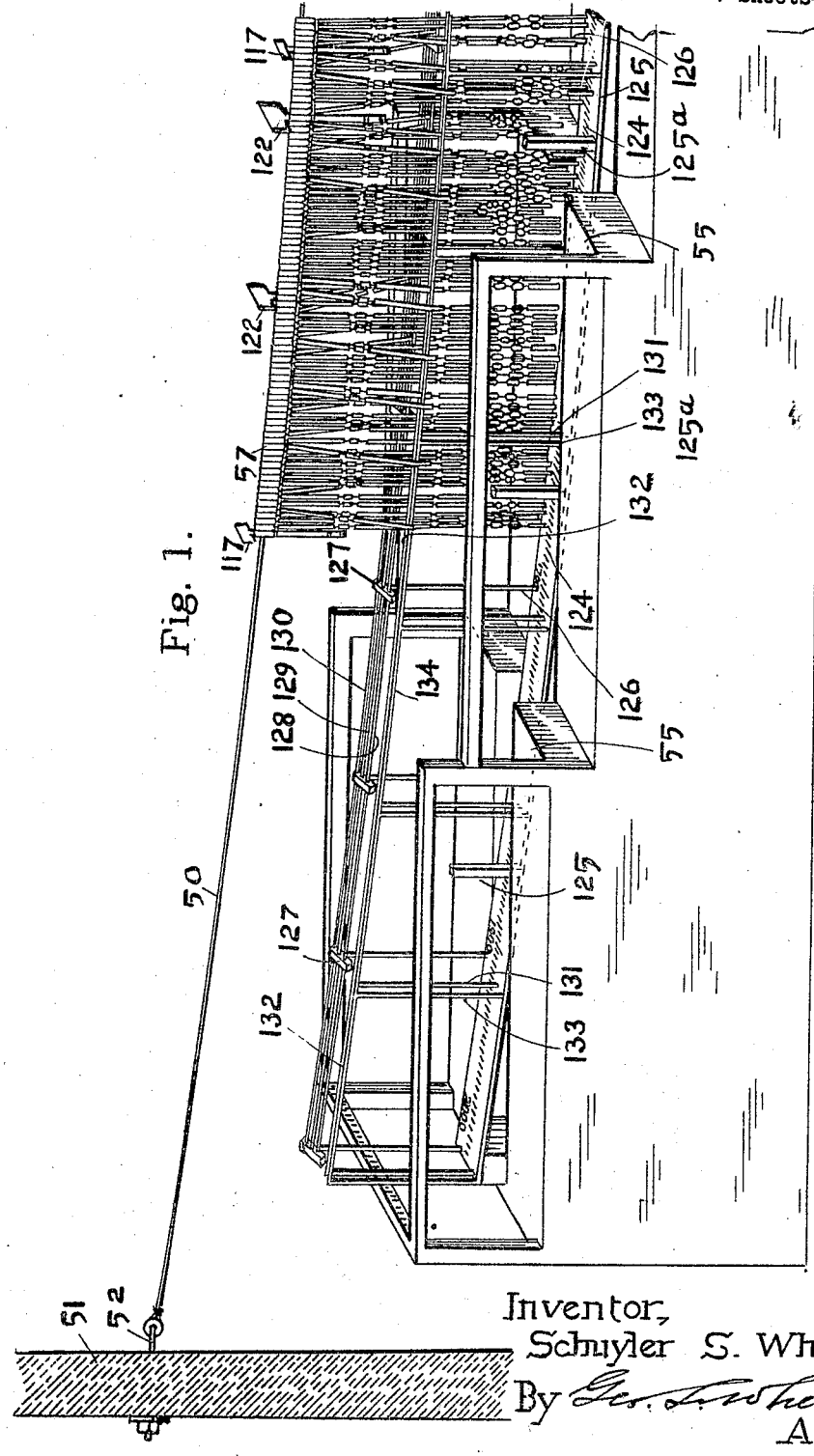

Jan. 22, 1924.

S. S. WHEELER 1,481,449

APPARATUS FOR INDICATING AND EXPEDITING WORK

Filed Oct. 21, 1920     7 Sheets-Sheet 3

Inventor,
Schuyler S. Wheeler,
By Geo. S. Wheelock
Attorney.

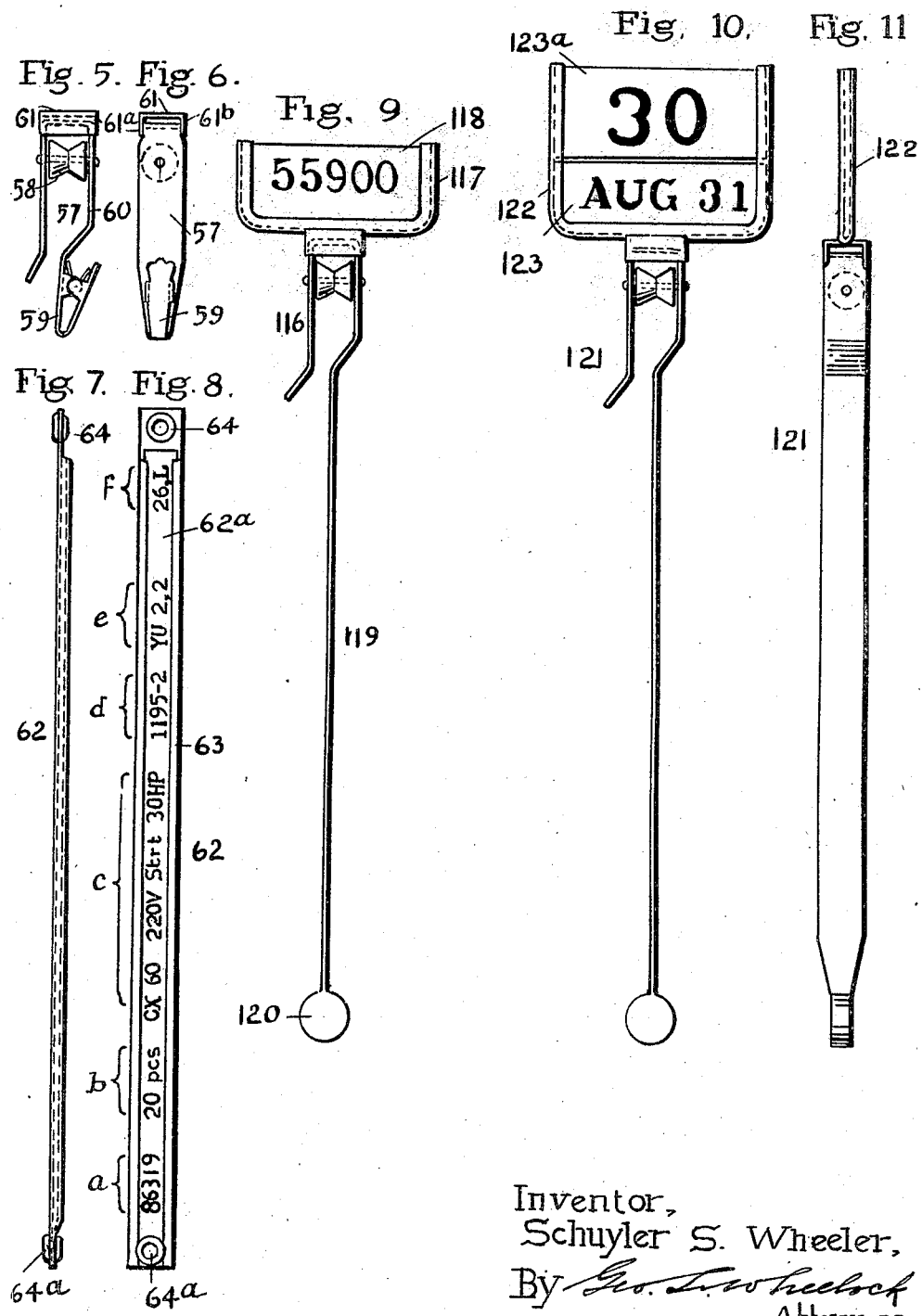

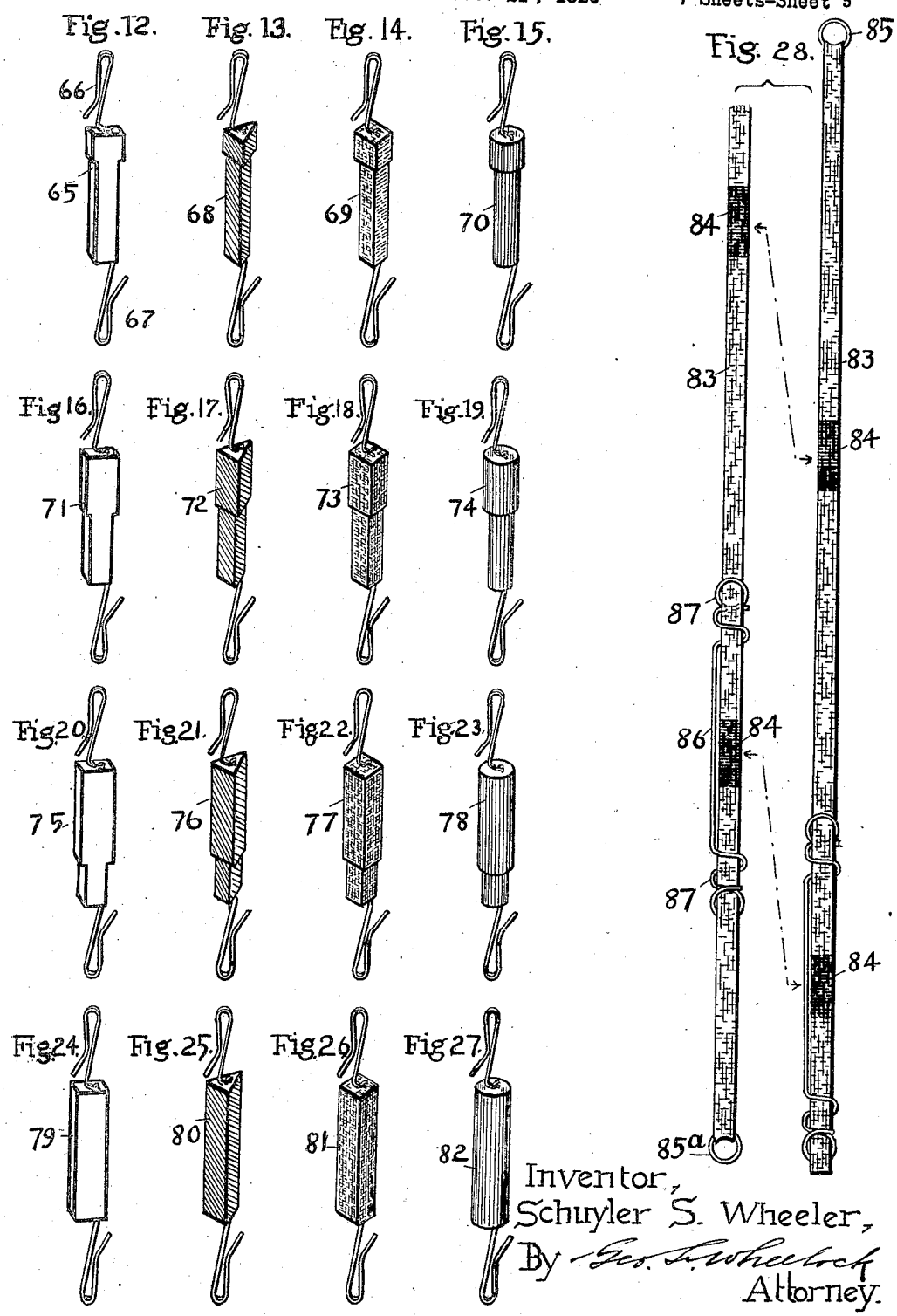

Jan. 22, 1924.
S. S. WHEELER
1,481,449
APPARATUS FOR INDICATING AND EXPEDITING WORK
Filed Oct. 21, 1920    7 Sheets-Sheet 6
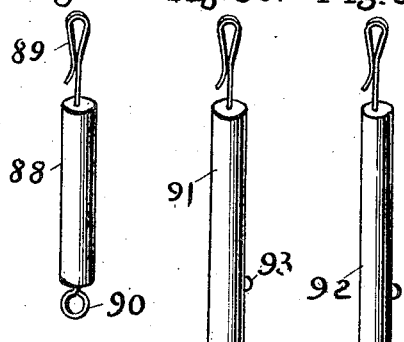
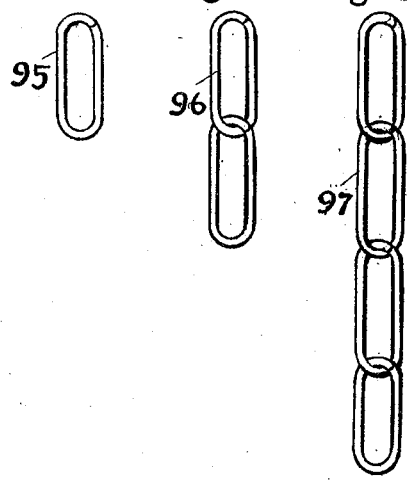
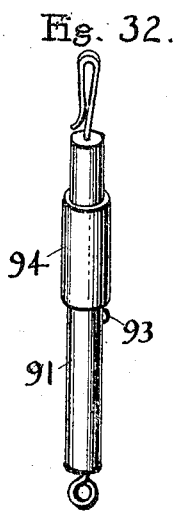
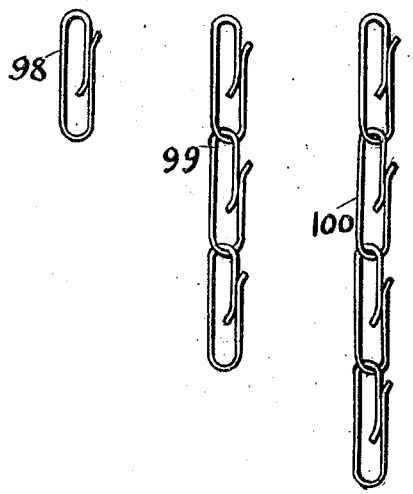
Inventor,
Schuyler S. Wheeler,
By Geo. S. Wheelock
Attorney.

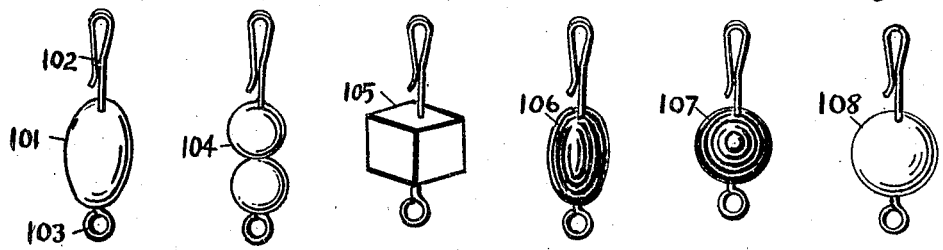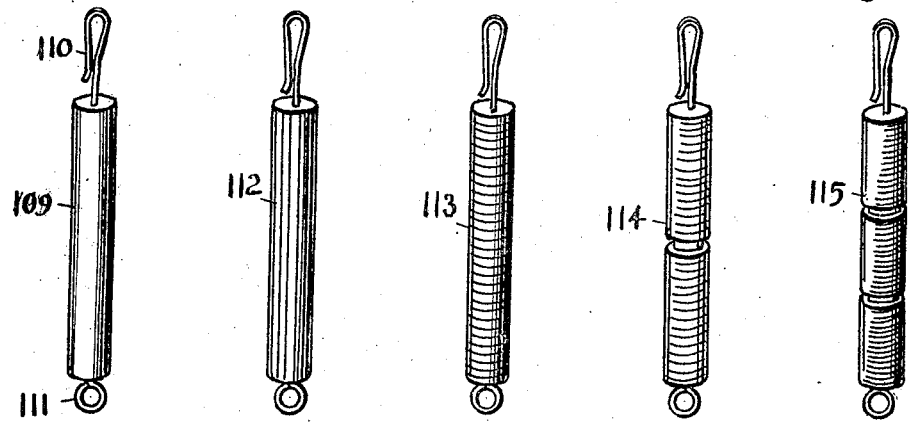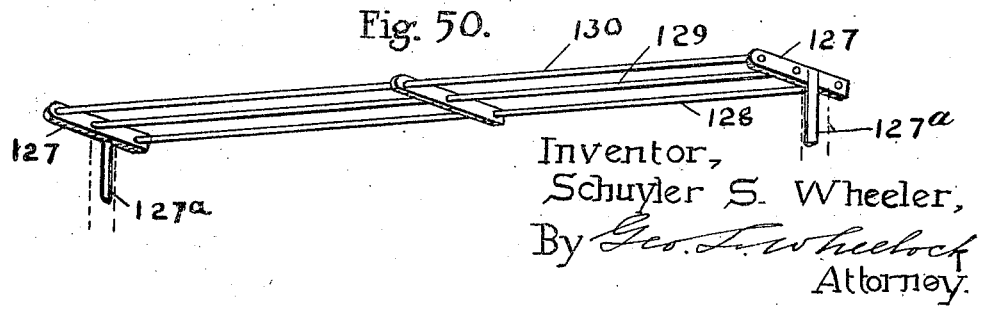

Patented Jan. 22, 1924.

1,481,449

UNITED STATES PATENT OFFICE.

SCHUYLER S. WHEELER, OF BERNARDSVILLE, NEW JERSEY, ASSIGNOR TO CROCKER-WHEELER COMPANY, OF AMPERE, NEW JERSEY, A CORPORATION OF NEW JERSEY.

APPARATUS FOR INDICATING AND EXPEDITING WORK.

Application filed October 21, 1920. Serial No. 418,602.

*To all whom it may concern:*

Be it known that I, SCHUYLER S. WHEELER, a citizen of the United States, residing at Bernardsville, county of Somerset, and State of New Jersey, have invented certain new and useful Improvements in Apparatus for Indicating and Expediting Work, of which the following is a specification.

In its preferred adaptation the invention relates to a system or means for the control of production and material in a factory, or for the control of goods purchased and sold by merchants or otherwise, although it is capable of all possible uses where there is a long series of subject matters to be recorded and followed up, and where related facts as to each subject matter are noted for subsequent information. The invention may be adapted for recording statistical informaiton, for example.

Typewritten lists, card index systems and all kinds of charts have been used with a view to such control. A typewritten list has the fatal objection that it must be altered by erasure and addition, soon becoming illegible, and filled with " dead wood," while a card index system or catalogue has the objection that one cannot see at a glance approximately the total number, or the numbers of one class, and that after a large number of cards are withdrawn from each drawer, the remainder must be transferred by hand from one drawer to the next in order to close up. Charts are about equally objectionable, inasmuch as, while a chart may partially suffice for a small concern, it can in no reasonable measure fulfill the needs of a large concern, even though the chart may be colored up at different points to indicate certain facts. Even then it is generally necessary to make use of a plurality of charts. All of these means have the objection that mental concentration is required for reading them—reducing the energy left available for action after reading. In all these forms of lists energy is also lost in searching to pick out from the whole the items wanted, and omitting, while reading, those portions of information about the articles in question that are immaterial to the search in hand. Under the present invention, a number of subject lists are abstracted by experts from day to day, and these embrace only the articles involved and are limited purposely to the data out of the whole concerning each article that appertain to the work for which the subject list is drawn off. Each subject list is therefore clean and neat, and does not require any words or figures to be read by the worker that are not necessary to his work.

Nothing is more destructive to thoroughness, exactness and promptness in employees than scratched lists, except possibly, long lists. If a single item is scratched it leaves the employee to doubt whether some other item which is included should not have been scratched also, and if he is given a list which is largely scratched and added to, one is calling on him to search through the rubbish for the live matter. It is practically impossible for an employee to abstract accurately from a very long list, if it has to be done often.

One can imagine a typewritten list of, say, sixty pages of legal cap, one item to the line, which had been rewritten clean a month ago, which would be recent for such a long list, and to which had been added during the month twenty new pages, while old items scattered throughout the list had been scratched off at the rate of fifty or seventy-five each day during the month. For instance, imagine going through such a list to find out all the items that relate to direct current motors being produced by an electrical plant, which perhaps might amount to 10% of the total of perhaps 3,000 items. It would take several hours, and very likely one or two would be overlooked. Assume that several thousand workers are engaged in the productive end of a manufacturing plant, and it will be seen that the task of keeping the record abreast of the actual work presents a considerable problem which may be largely solved by breaking the task up into sections by way of systemizing it. With a view to overcoming the objections due to the systems referred to, one of the objects of the present invention is to provide a living job list which may be located in a room by itself and comprises a method and apparatus for keeping track of jobs and hurrying them up by a number of means. New jobs are added, closed jobs taken off and numerous facts about progress,—such as the arrival of material,—are registered by the attendant as soon as reported, as by telephone, from the several departments. The list is, therefore, not only kept up to date, but up to the hour. It is designed particularly to render easy the preparation of various detailed lists for the use of the shop and purchasing department of a factory, for instance.

The general objects may be summed up about as follows:

To provide simple means of furnishing working departments with lists of shop orders, to guide those concerned and show whether any orders are falling behind.

To afford a view at a glance of the total number of orders and of the situation with respect thereto.

To give the minutest details when needed respecting a single order or of a few orders, or a more general report of the entire lot.

To provide a filing or recording system in which spaces made blank by finishing and withdrawal close up automatically, so that a solid list is always presented, while the individuals retain their relative positions.

To show the whole at a glance, or details as may be needed, of those that are not yet ready for the shop on account of absence of material, those that are already in the shop, those that have been in the shop longer than the time allowed for their completion, and those that have been finished by the shop, but not yet finished in the bookkeeping.

To make wide distinctions between ones that are in different status, such as by having their indicia in opposite directions for easy vision of such groups, and for the convenience of different sets of clerks specializing on different parts of the clerical work, while allowing each item to retain its position in numerical order. This gives the effect of having two or three entirely separate and distinct lists in which the items may readily be redesignated from one to the other, and which, nevertheless, remain all one list.

To provide a central record, always correct up to the hour, to which the different branches of the business may report, and which is neatly corrected as necessary.

To show the rate of progression of orders from the date of beginning to their completion.

To show the age in weeks of each order, and of each different portion of the total list, and of the quantities of each portion, and the total quantity.

To provide means of constantly advancing the records of age and keeping records of the progress of the work on each order, so that every subject list taken from time to time, covering different groups, shall be correct in each of its items to within the hour.

To provide a quick and instantaneous means of communication by telephone from any of the desks of different departments to all portions of the apparatus, and vice versa.

As before stated, this invention may be applicable to the use of merchants or others, in which case, possibly some of all of the above objects named which are specially applicable to factories might not be applicable.

These being among the objects of the present invention, the same consists of certain method steps, features of construction and combinations of parts to be hereinafter described and then claimed with reference to the accompanying drawings illustrating a preferred or desirable embodiment of the invention, and in which—

Fig. 1 is a perspective view of a portion of the apparatus or system;

Fig. 2 is a side elevation of a portion of the apparatus, the tackle or "harness"—as it will be termed herein—being omitted, such portion corresponding substantially to what is illustrated in Fig. 1 in perspective;

Fig. 3 is a side elevation of the other end of the apparatus similarly illustrated, the entire apparatus, with the exception of the harness, being seen by combining Figs. 2 and 3 end for end;

Figs. 5 and 6 are, respectively, edge and face elevations of a trolley;

Figs. 7 and 8 are, respectively, edge and face elevations of a label-holder;

Fig. 9 is an elevation of a numeral trolley;

Figs. 10 and 11 are, respectively, edge and face elevations of a date trolley;

Figure 4:
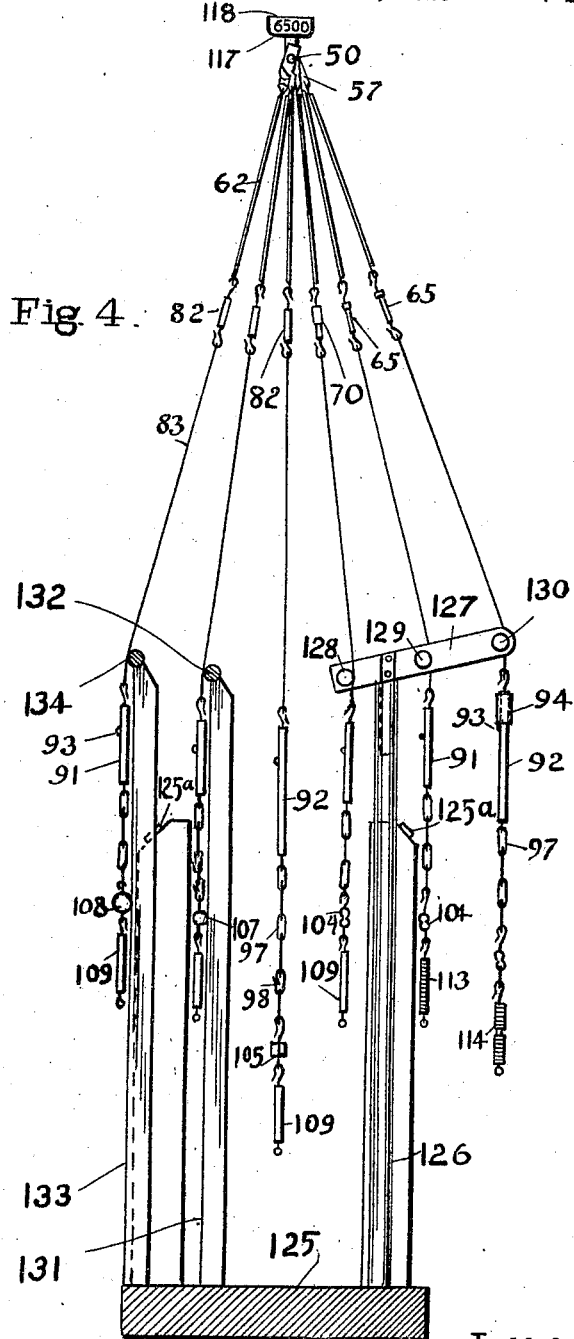
Fig. 4 is a transverse section of the complete apparatus showing deflected groups of markers or indicators.

Figs. 12 to 27 inclusive illustrate different shapes of rank and character markers or indicators;

Fig. 28 is an elevation showing the progress tape broken in two sections for convenience of illustration, the middle portion being repeated, with its slider;

Figs. 29 to 32 inclusive illustrate speed experience indicators or blocks;

Figs. 33, 34 and 35 illustrate purchasing delay links or indicators;

Figs. 36, 37 and 38 illustrate shop delay links or indicators;

Figs. 39 to 44 inclusive illustrate various forms of chaser beads in perspective;

Figs. 45 to 49 inclusive illustrate various forms of urgency signals in perspective, and Fig. 50 is a perspective view of a detail of a rail.

The invention will be described as if it were applied only to a factory for electrical machines, although it may be otherwise applied. When applied to a factory the mechanism of the present invention is preferably located in the job room.

Referring to Figs. 1, 2 and 3, a wire or rail or other linear support 50 is suspended in the room as an aerial line. The said wire 50, or the like, forms a single track, and it is stretched across the room so that it will incline downwardly from one end. The higher end of the wire 50 may be attached to the wall 51 by means of a tie-bolt 52, which passes through said wall and is provided with a tightening nut 53 at the outer side of the wall, although instead of a wall, some other form of support for the higher end of said wire may be employed. As shown in Fig. 3, the lower end of the wire 50 is secured to a post or upright 51ª, of sufficient strength to withstand the tension placed upon the wire. Between the post 51ª and the opposite wall of the room sufficient space is left for a passage 54 around that end of the apparatus. Inasmuch as the wire 50 is preferably inclined, and it must be accessible to the help who attend to the apparatus, steps 55 are provided upon that end of the floor 56 which is located under the higher end portion of the wire or track 50. These steps form passageways at each side of the apparatus.

Leaving Figs. 1 to 4 for the present, the description will apply to the remaining figures which show the preferred various components of the groups or strings of markers or indicators which go to make up the harness.

Referring to Figs. 5 and 6, a trolley 57 is illustrated, which is preferably composed of a strip of metal bent up into hook form, and provided with a grooved roller 58 at its upper end, and a snap fastening or hook 59 at its lower end. The metal strip of which the trolley is composed is indicated by the numeral 60. At the bent upper end of the trolley 57 there is applied a head or cap 61 of sheet metal, having square faces. These trolleys are placed as desired on the line or track 50, and are each of the same dimension between the faces of the head or cap 61, which may be designated a "spacer head." There may be several thousand of these trolleys placed upon the inclined rail or track 50, and the rollers 58 enable the trolleys to roll easily down the line.

Each snap hook 59 is adapted to support a label-holder 62, which is preferably about eight inches long, to receive a single strip 62ª of typewritten matter, which will be referred to hereinafter. Label-holder 62 is preferably composed of sheet metal bent up so as to provide inturned longitudinal edge portions 63—63, which provide a guide for the typewritten strip 62ª. The upper and lower ends of the label-holder 62 are provided with eyes or holes 64, 64ª, respectively. The snap-hook 59 of each trolley is engaged with the eye 64 of label-holder 62, so that it will be suspended therefrom when the trolley is suspended on the line.

In Figs. 12 to 27 inclusive, various shapes of markers or indicators are shown for indicating rank and character of a job. It will be noticed that the cross section of the rank and character indicators shown in Figs. 12, 16, 20 and 24 is the same for all of them, forming a rectangular oblong for the blind. In Figs. 13, 17, 21 and 25, the cross section is the same for all, that is, it is triangular. Similarly, as to Figures 14, 18, 22 and 26, in which the shape is rectangular, and in Figs. 15, 19, 23 and 27, in which the shape is circular. These respective shapes may indicate raw products, detail parts, large parts and finished motors. The same facts may also be indicated by color for the sighted, that is to say, the indicators in Figs. 12, 16, 20 and 24 may be white, the indicators in Figs. 13, 17, 21 and 25 may be blue, the indicators in Figs. 14, 18, 22 and 26 may be yellow, and the indicators in Figs. 15, 19, 23 and 27 may be red. Furthermore, the indicators shown in Figs. 12 to 27 may be of different shapes longitudinally. The indicators shown in Figs. 12, 13, 14 and 15 may have three-quarters of their length reduced, leaving a larger cross section at the upper ends. Similarly, the indicators shown in Figs. 16, 17, 18 and 19 may be reduced for one-half of their length, those shown in Figs. 20, 21, 22 and 23 may be reduced for one-quarter of their length, while the indicators shown in Figs. 24, 25, 26 and 27 are not reduced at all, but are of the same cross section throughout its length. The reason for the longitudinal formation of the indicators shown in Figs. 12 to 27 is to provide means for indicating how much material is to be purchased. For instance, the indicators 16, 17, 18 and 19 which are reduced transversely for one-half of their lengths will indicate that one-half of all the material required for the job has to be purchased.

As the indicators just described are different in all the figures mentioned, they are given the reference numerals 65 to 82, running in sequence. Each of the indicators 65 to 82 has wires running longitudinally therethrough and clenched thereupon, these wires providing, for each indicator, hooks 66 and 67 at the upper and lower ends respectively. Hook 66 is adapted to be engaged with eye 64ª of the label-holder shown in Figs. 7 and 8. The bodies of these indicators are preferably one inch in length.

A tape or strip 83 is shown in Fig. 28. This is a narrow tape, preferably fifteen inches in length, and is provided at regular intervals throughout its length with markings 84, and the tape is provided at its upper end with a ring or eye 85, and with a similar ring 85ª at its lower end. The ring 85 is adapted to be engaged with hook 67 of any one of the indicators shown in Figs 12 to 27. Arranged upon the tape 83 is a slider 86, preferably formed of wire, and provided with tape-engaging portions 87, 87 at its ends. This slider may be adjusted upon the tape to any point desired to indicate different stages in the progress of the particular job represented.

In Figs. 29 to 32 inclusive, speed-experience indicators or blocks are illustrated. These indicate the time which it is expected it will take to perform the work according to past experience in the plant. The indicator 88 shown in Fig. 29 is, say, one inch in length, and it is provided with a wire extending therethrough, and formed at its upper end into a hook 89, and at its lower end with an eye 90. The hook 89 is adapted to be engaged with the eye 85ᵃ of the progress-tape shown in Fig. 28. The speed-experience-indicators or blocks 91 and 92 shown in Figs. 30, 31 and 32, are longer than the one described, the one shown in Figs. 30 and 32 being, say, two inches in length, while the one shown in Fig. 31 is four inches in length. All of these indicators have similar hook and eye to 89, 90. The indicators shown in Figs. 30, 31 and 32 are provided with a laterally-projecting stud or abutment 93, on each of which may be slipped a department-ring 94 to indicate the department. There may be a great many department rings of different materials, lengths, thicknesses and color to indicate different departments.

With the eye 90 of any one of the indicators shown in Figs. 29 to 32 may be engaged any one of the series of links or indicators shown in Figs. 33, 34 and 35, or in Figs. 36, 37 and 38. These may be termed delay-links or indicators, and represent any delay in weeks in getting in the material to be used, for example. For instance, link 95 is a single link and indicates one week's delay. There are two links 96 shown in Fig. 34, and four links 97 in Fig. 35, indicating, respectively, a delay of two weeks and four weeks. The links shown in Figs. 33, 34 and 35 are preferably heavier than those in Figs. 36, 37 and 38, and are cut across to facilitate their engagement with the engaging means with which they are to be engaged. They are preferably cut at the ends, and preferably represent purchasing-delay-links to indicate delay in getting in material purchased. The links 98, 99 and 100 shown in Figs. 36, 37 and 38 are preferably lighter than the other links or indicators shown in Figs. 33, 34 and 35, are preferably open at the side so as to facilitate their engagement with each other and with other parts with which they are to be engaged. These links preferably indicate delay in the shop in production. All of the said links shown in Figs. 33 to 38 inclusive are preferably of the same unit of length, say, one inch. The upper ends of links 95, 98, and of the series of links 96, 97, 99, 100 may be engaged with the eye 90 of one of the experience-links or indicators shown in Figs. 29 to 32.

In a factory of sufficient size it is desirable to provide means for indicating an employee who has charge of one particular line of work. To that end beads or indicators shown in Figs. 39 to 44 may be employed, there being a different shape of bead or indicator for the blind for each chaser. The bead or indicator 101 shown in Fig. 39 may be of egg-shape, with a wire extending longitudinally therethrough, and provided at its upper end with a hook 102, and at its lower end with an eye 103. A duplex bead or indicator 104 is shown in Fig. 40. In Fig. 41 a cubical bead or indicator 105 is shown. In Fig. 42 a bead or indicator 106 is shown, which may be smaller than the bead 101, although of the same shape. In Fig. 43 a spherical bead or indicator 107 is shown, while in Fig. 44 a similarly shaped bead or indicator 108 is shown, but it is larger than the bead 107. All of these beads or indicators shown in Figs. 39 to 44 are equipped with engaging means similar to what is shown in Fig. 39. The hook 102 may be engaged with one of the links shown in Figs. 33 to 38 inclusive. They are of different colors for the sighted.

Referring to Figs. 45 to 49 inclusive, there is shown a series of pieces which may be of substantially the same length, and colored, the color, if desired, being natural wood, red, blue, or other color to represent the degree of "hurry" of the job. For instance, blue may indicate that the job is in greater hurry than the red, and red may indicate a greater hurry than plain or natural wood color. These are called "urgency-signals." The signal-piece 109 shown in Fig. 45 is, say, about two inches long of cylindrical shape. Throughout there extends a wire which at its upper end is bent up into a hook 110, and at its lower end into an eye 111. The urgency-signals 112, 113, 114, 115 in the other figures are of the same length, and are equipped with hooks and eyes similar to 110 and 111. Hook 110 of either of these signals may be engaged with eye, 103, of a chaser-bead or indicator, such as shown in Figs. 39 to 44 inclusive. To furthermore indicate the degree of speed required, the signals shown in Figs. 48, 49, for instance, may be circumferentially grooved for the blind.

The various means shown and described for performing as a unit a given function, or for indicating a particular fact, are of corresponding lengths, and where different lengths are shown, they preferably constitute multiples of such given unit of length. With a series of groups of properly connected functioning means and indicators strung on the line 50 of Figs. 1 to 4 inclusive, it is possible for anyone with sight or blind to quickly pick out and ascertain the fact intended to be represented, not only by reason of the colors, but the shapes which are employed. A blind person may quickly pick out different indicators and ascertain different facts by reason of different shapes which are employed, or by reason of there being multiples of a given unit which indicates time to finish.

The description will now apply to a fuller explanation of parts which have been heretofore mentioned, and to parts which have not been referred to. It is to be repeated that the harness, which is suspended from the aerial or other line 50 of Figs. 1 to 4 inclusive, is composed of heddles, each heddle being in turn composed of a trolley, and the parts before mentioned, which are attached to, and suspended by the trolley. The label 62$^a$, Fig. 8, which is placed in the label-holder 62, is cut from the typewritten list, and gives all necessary particulars of the job. There is hung on the label-holder the various markers or indicators of the remainder of the group forming the heddle, which markers accord with the information given in the label 62$^a$, so that it is no longer necessary to read the label to obtain the desired information as to what the label indicates. The information given on the label, shown in Fig. 8, and the arrangement of which applies to the arrangement on the other labels which are used, is as follows:

At $a$ appears the job serial number,—for example: 86319. At $b$ appears the information as to the quantity called for in the job, for instance: 20 pieces. At $c$ appears the name of the article and description; for example,—"CX" indicates the type of an electrical starter for motors, for instance. "60c" indicates the cycle. "220 V", the voltage, and "30 H. P.," the horse power. At $d$ appears the catalogue number of the article which is also the ledger page number of the stock accounts of the same, namely, 1195—2. At $e$ appear several letters and figures which tell the quantity of the article required to make one motor, the rank or manufacturing grade of the article, and the length of time in weeks in which it should be manufactured. At $g$ (the end of the label) are figures indicating the department in which the article is manufactured and a letter indicating the name of the chaser whose duty it is to follow this class of goods. All of the symbols at $d$, $e$ and $f$, thus indicate different facts or points relative to the descriptive matter appearing on the label 62$^a$, and tangible or physical and, if desired, colored indicia are attached to the label-holder to separately indicate the same facts or points.

After each hundred jobs are hung on the line 50, a special trolley-hook 116, without a label-holder 62, is hung on the line, the same being shown in Fig. 9. Hook 116 carries a frame 117 above it, grooved so that a card 118 may be inserted in it, said card showing plainly the number of the next order,—for example, "55900," and as new orders are put on, when the end of the week is reached, another special trolley-hook 121, Figs. 10 and 11, is put on. Special trolley-hook 121 is provided with a similar frame or other means 122, for receiving a card 123, on which appears the date. Each special trolley-hook 116 and 121 may be constructed with an elongated shank 119 provided at its lower end with a weight 120 so as to cause the trolley to set automatically in a vertical position, as by a plumb-bob. The arrangement is similar to a line of billiard markers on their wire, with their numbered markers at intervals. The date-trolleys 121 have a high frame 122 to hold an additional card 123$^a$ representing the age in weeks,—the last one put on bearing the mark 0, and the one put on the week before, the mark 1, and so on. If such additional cards are used, each of these age cards is taken out of its frame at the beginning of the week and put in the frame next higher up on the line 50, so that in effect the cards representing the ages remain stationary while the harness consisting of all the job heddles and all the dates gradually gravitates down the line, which may be at the rate of about fifteen feet per week.

All of the trolleys specifically described herein are faced on both sides with metal, as at 61$^a$, 61$^b$, Fig. 5. The facing is in the same direction as the line 50 extends so as to present a square thrust of one trolley against the other. The trolleys may each measure exactly three-eighths of an inch longitudinally with the line 50, so that a scale 124 serves to indicate at all times just how many order there are on the line from its bottom up to the next order, and also, how many there are from the bottom up to any point,—for example, to the point of age, 30; and date, August 15th. The scale 124 would be graduated with marks three-eighths of an inch apart, if that was the measurement of the distance between the abutting faces of a trolley. As shown in Figs. 1, 2 and 3, the scale is marked on a base 125, which is here shown in the form of a plank, which is coextensive in length, substantially, with the length of the line 50, and is preferably placed 49 inches below the line and should be parallel to it. Said base 125 would then be supported in any suitable manner upon the floor 56 and would run over and be supported upon the steps 55. The line and base and all rails are preferably in a catenary.

Referring also to Fig. 4 as well as Figs. 1, 2 and 3, the stationary "frame" of the apparatus—as it may be designated—comprises standards 126 rising from the floor 56, and at their upper ends supporting the cross-bars 127, which are inclined upwardly from their inner ends. These standards 126 and the cross-bars 127 are located to the right side of the vertical plane looking from the low end in which the heddles hang normally suspended from the line 50. Connecting the cross-bars 127 are three parallel equi-distantly-spaced rods 128, 129 and 130, the said bars the cross-bars 127, and the standards 126 constituting a stationary structure removable in sections. This structure is located to the right of the vertical plane of the line 50, as viewed from its lowest end. At the left-hand side of the vertical plane of the line 50 there is a series of standards 131 rising from the floor 56, their upper ends being connected by a rod 132. To the left of the standards 131 are similar standards 133, the upper ends of which are connected by a rod 134 parallel with the rod 132, and placed at a slightly higher elevation.

The three rods 128, 129 and 130 at the right may for convenience be termed the "bar." These are on the shop side, and said rails or rods are for use in holding the heddles in a position swung slightly sidewise of the vertical plane of the line 50. The heddles hang over these rods to facilitate dictating a subject list. The two rods or rails 132, 134 at the left may be designated the "rail," and are on the despatch side of the line. The operator of the despatch side is charged with the duty of reporting to those (the chasers) who get in the material. All heddles representing orders,—the material for which is not in—hang permanently over these two rails 132, 134, and are not free and accessible to the clerk who is listing for the shop. Their labels also face away from the shop side. The label-holders 62 are unhooked from the trolleys and turned around to face the shop side and are then hooked on again when the material is all in and the job is what is called "cleared" to the shop.

The terms "harness," "heddle" and "shed" used herein have been taken because the apparatus that seems most similar to this invention is the weaver's loom, and therefore, the whole line is called a "harness," and each group or string of markers representing an order a "heddle," while the temporary separation of those that represent any particular subject while lifted over the rail to separate them, is called a "shed."

The harness and the heddles afford an opportunity for use of a remarkably wide variety of markers or indicators and other means of all sorts for indicating different things. In the first place, there are the fixed markers which are put on at the beginning and simply represent for easy vision the facts stated in the label. These markers or indicators are preferably made of precisely uniform lengths, that is, the corresponding markers, so that, with one exception, the heddles are uniform in length. The one exception is the marker 88, 91 or 92 to show the length of time allowed for the manufacture, which markers vary in length. Consequently, any means of interpreting the varying total lengths of the heddles in view of the distance that each has travelled down the line 50 will make very clear the question of which jobs are overdue, whether their allowed time be one, two or four weeks. Then, there are the markers of date and number in hundreds, which always retain their relative position travelling along the line 50 with the jobs, and which, therefore, give information upon reading the stationary scale 124.

Then, there are the markers for age, which in effect remain stationary while the jobs travel along, and constantly give corrected age information.

Then, there are markers appropriate to be added as the orders progress, and others to be taken off as the jobs progress, and the slider 86 on the tape 83 for use in recording fluctuating conditions.

Then, special markers may be attached temporarily, made of different shapes and appearance, and others bearing the name of an individual, which mean that that article is under a special investigation by that individual.

Then, there are the general means of distinguishing the whole classes of jobs by deflecting them angularly away from the vertical plane of the rail 50, as indicated in Fig. 4. Those that are deflected over the two rods on the left, some at a small angle and some at a large angle, indicate that they are waiting for material from the shop and for material from the outside, respectively. Those deflected to the right temporarily over the three rods 128, 129, 130 at a small angle, at a medium angle and at a large angle, respectively, are those of which a subject list is being prepared on that day, presumably by telephonic dictation, and the list itself is being made in three parts, namely, "plain," "urgent," and "imperative."

The use of a telephone has just been indicated as desirable. The telephone connection, if used, is a common wire running the length of the line and around to the desk of each clerk in different departments who has duties connected with the shop, and it has spring-jacks located about ten feet along the length of the line 50, these jacks being fixed in posts 125ª from the base 125. A separate push-button system would be used for calling, with a button and buzzer, and is run to each telephone so that any clerk in any department wanting to know about some order has only to touch his or her button and lift the receiver, and the job clerk with a head telephone on will plug in at the jack nearest the particular job and read off the information desired. If the job clerk wants something investigated by a particular department, said clerk rings the buzzer in that department and the clerk thereof comes on and is asked the information and gives the reply. This line is used by the clerks in different departments in reporting every few hours the jobs for which they have received material, and which may, therefore, be cleared, etc. The shop job clerk also uses it for dictating to a typist at a desk, the job clerk plugging in at different jacks as he or she has to move along the length of the line for reading.

By the means herein described, the task of keeping the record abreast of the actual work is divided into the following, which are quite distinct from each other, so that each clerk specializes and thus sees the end of his day's work:

Maintaining the master list; turning shop orders to the shop side; picking out and swinging aside those of one subject; calling for the material and parts essential for inclusion in one subject, and typing a list of these jobs.

The advantages of specializing is shown in the typing, which is a steady task, always requiring the same form of tabulation, making it a suitable work for a blind typist. The preparation of the subject lists is facilitated by the described devices, or the equivalent, for easy vision or fingering. It is easier to pick out of a mass all labels that have a red ball one inch in diameter attached to them than it is to scrutinize the labels and pick out all those that have written on them "one inch red ball." If all the labels are strung up on the line one can form an idea at a glance occupying a fraction of a second whether the proportion of those distinguished by such red ball is large, or small, whereas, to determine this by reading all the labels would take a long time and would absorb an appreciable part of the enumerator's energy, leaving a smaller portion of time for thinking of what had better be done about it, and also, when the reading is finished, the clerk would not have a good general idea of their proportion to the whole.

The method and apparatus of the present invention makes extensive use of this practice. The different facts and data about the orders, which it is important that the factory force and the management should know are typewritten on the labels and then are represented by the different kinds of markers or indicators, as in a kindergarten, and the kindergarten principle is valuable in reducing the mental load that a long production list—which is the hardest kind of reading—constitutes. By using this principle the minds of the clerks are left free to do the listing work, reducing the mental effort required to find out what they are to do from that requiring a mentality of perhaps fifteen years of age, to that found in from four to six years of age.

For example, to make from the entire list of orders that subject list which has for its subject all the direct current motors, (if the factory be an electrical factory,) that are on order, one first picks out all the red balls, and then dictates to a typist the workman's portion of what their labels say, and this, of course, is done without displacing the labels, which are scattered all along the line, from their positions on the line. If the factory manufactures electrical apparatus, and it is desired to make the subject list of alternating motors, all of the square green blocks are picked out. If the subject list is desired of all jobs, regardless of whether they are alternating or direct or anything else, that should be finished in one week, the pendant or indicator such as 88, which is one inch long, is picked out. If the list is desired of those that require four weeks' time, the pendant or indicator such as 92, which is four inches long, is picked out.

An important result accomplished by the described method and apparatus is in spreading out the list so as to be simultaneously accessible to a plurality of clerks. If a clerk is working on a typewritten list, such clerk has the list, and probably no one else can work on it. The difference in this regard and the advantage of the living job list is illustrated by supposing that the many pages of an ordinary typewritten list were pasted end to end along a line at a convenient height for reading, where they would extend perhaps 100 feet. It will also be necessary to suppose that the wall is transparent, and that those orders which have been turned over to the shop to work on were written on the reverse side of the paper, so that the clerks reading them would be on the other side of the partition.

The apparatus is in a sense a clearing-house for information, upon each item of many, constituting the whole subject, or is both a recording place and a source of information at which a number of recorders, and also a number of abstractors, may all work at the same time. Since the recorders are thus enabled to act quickly and keep all entries posted up to the hour, it can always be depended upon that the information, abstracted upon demand at any moment from time to time, and much of it at regular predetermined periods, contains the latest information to make it good for many different kinds of information about the items, so that subject lists of very different scope may be drawn off. Its provision of data is full. All of the essential particulars of each job order, say, perhaps a dozen different factors, are uniformly included, but when a subject list is taken off from it, besides limiting it to the cases of that subject, only such factors concerning the cases need be entered on the subject list, as will be useful at the time. For instance, a list called for suddenly, perhaps for use in hurrying all 100 H. P. motors, would embrace only the 100 H. P. motors, and for each item there need be stated only its order number and its title, leaving off all other factors, and thereby avoiding encumbering the subject list, and of course, saving encumbering the mind of the person who is to make use of it.

It is obvious that a superintendent's direction to an assistant to investigate or push a subject is greatly vitalized by being accompanied practically immediately by a complete and clean list of all the orders involved, and the assistant's efforts are made much more direct by the receipt of such list, while, by the omission from it of all factors except those with which he is at the moment concerned, his mind is concentrated upon what he is to do.

The specific method of operating the apparatus is as follows: The bookkeeping department, which issues new jobs, states the order number, catalogue number, the quantity and name of the article, and other essential particulars, on a typewritten sheet with double spacing. These sheets are sent to the job room, where they are cut up uniformly into long labels or strips, such as 62ª, which fit the label-holder 62. The despatch job clerk slips these labels into the label-holders 62, attaches the various markers or indicators, such as 65, 83, 89, 95, 101 and 109, and hangs the trolleys with their said markers on the line, deflecting them over the despatch rails, 132, 134, according to whether the orders are to be made from stock or purchased material. When the despatch job clerk is advised later that all the material is in and the order cleared, she unhooks the label-holder 62 from its trolley and turns it around to face the shop side, takes it off the despatch rail so that it will hang down straight, and adds links or markers, one for each week of delay so far if any, according to the nearest age card up the line. She is then through with her duties and the job will be included in her next listings by the shop job operator. The shop job operator proceeds by a fixed schedule, jobs of a certain kind and for a certain chaser are listed Mondays, another kind, Tuesdays, and so on. All the heddles or groups of indicators or markers carrying the bead of indicator, for example 101, of the chaser whose day is Monday, will be lifted over one of the shop rails 128, 129, 130, and she will then dictate to her typist these names, numbers, speeds and ages. She places those with blue markers or indicators, such as 113, 114, 115, over the outer rail 130, those with red markers or indicators, such as 112, over the middle rail 129, and those with plain markers, such as 109, over the inner rail 128. In dictating she dictates first those on the outer rail, then those on the middle rail, and then those on the inner rail, thus making a list in which occur first in the group those in the greatest hurry, and so on.

For a close checking of the shop, it is desirable to distinguish the length of time the shop has had the order, from the gross time since it was written, as shown by the nearest age card. This is accomplished by the dictator hanging a small ring on it each week when she dictates it, and then stating in her dictation the number of rings present under the heading "shop age." She also dictates the weeks allowed, or the shop speed, as shown by the length in inches of the speed-indicator or block, such as 88 or 92. When the shop reports the order finished the clerk takes it entirely off the line and may place it on a separate line on the side of the room, where it remains until the bookkeepers report it closed out on the books, when it is taken down altogether and the various markers separated or sorted into their boxes, like fonts of type. All new orders are, of course, added at the top, or highest end, of the line 50, but since they are taken off as soon as finished, the effect of popping all along the line is produced. This scattering fire of withdrawal makes the speed of travel of those remaining greater at the high end than at the low end. The study of the graduated speeds is of value in showing at what age most orders are finished. When the shop betters its condition, this age becomes less, and vice versa. This is all made a matter of record by plotting on a chart a column for each week, and the positions of all of the markers or indicators at the beginning of that week as read from the stationary scale 124.

In the preferred form of apparatus the use of the variations of length of the heddle is reserved for indicating speeds, and the length of everything is reserved for expressing how much time it takes in weeks, one inch per week, and consequently it is essential that every other indicator should be of uniform length. If you know beforehand that four weeks is a reasonable time to complete, you put on an indicator four inches long, according to past experience. After you have gotten the material in, and you find it took six weeks to get the material, you add six inches to the length. To determine if the six weeks has been lost in getting the material, it is also fair to the shop to lengthen out the indication. The other indicia must not vary in length in the preferred form of the apparatus.

There is used one other special sign that is similar to the number in hundreds (trolley), and on it there is a big card marked "purchase clear," which is kept moved up the line from the lower end up against the oldest job that is still waiting for material and as a warning also to the purchasing department and the shop.

As to counting a total number of jobs by measuring on the scale; if an accurate account is desired for the purpose of an official report, there must be allowed the space taken by the markers 116, 121, because each takes $\frac{3}{8}''$. This may be done by the use of a separate hand scale, which is a reverse measuring scale, and shows multiples of $\frac{3}{8}$ in., if that be the dimension of each trolley, and the sum of the dimensions of the markers 116, 121 or the like is deducted from the length of the entire system of markers, as indicated by the scale 124.

It is to be assumed that in the preferred form of the invention, each trolley is slanted enough to balance roller friction.

Should it be desired to remove any section of the bar 128, 129, 130, which is composed of sections between adjacent cross-pieces, each section may be lifted away from the posts 126, due to the fact that the cross-pieces 127 are provided with pins 127ª, which engage the sockets of said posts, as shown in Fig. 50,—the posts being preferably formed of metal tubing for that purpose. The removal of a bar-section may be desirable if an attendant wishes to clear all of the heddles from that section at one time, instead of being required to disengage the heddles one at a time.

The described method and apparatus is, of course, susceptible of other than factory use, and it is obvious that the method may be varied, and the apparatus and indicators or markers be differently constructed, without departing from the spirit and scope of the invention as expressed in the claims.

What I claim as new is:

1. Apparatus for indicating and expediting work, comprising a suspension line, a number of strings or appendages representing different subject matters, and which are assembled on and detachably engaged with the said line, each string being built up of a number of indicators detachably connected together successively, and a passage for attendants at each side of the line of suspended strings or appendages, whereby the strings of indicators are rendered readable and accessible at one or both sides of the line, depending upon whether the indicators of any given string face away from one side or the other of the line.

2. Apparatus for indicating and expediting work, comprising a suspension line, a number of strings or appendages representing different subject matters, and which are assembled on and detachably engaged with the said line, each string being built up of a number of indicators detachably connected together successively, lateral means at each side of the strings of indicators over which any desired ones thereof may be deflected, and a passage for attendants at each side of the line of suspended strings or appendages; whereby, additional strings of indicators are adapted to be engaged with one end of the line as new subject-matters are created, any of the strings are adapted to be removed here and there from the line, in the nature of "popping off," as the subject-matters which they represent are completed and disposed of, and any of the strings belonging to a particular class may be deflected over either of said lateral means at one side of the suspended strings, to facilitate making a list of the subject-matters of that class, while all of the strings of indicators retain their relative positions or numerical sequence on the line.

3. Apparatus for indicating and expediting work, comprising a linear support, and a number of pendent strings of indicators, arranged on said support in close succession and detachable therefrom, each string being built up of the same number of different indicators, each string representing a different subject-matter, and the indicators forming each string being readily visible as to the difference of their meaning.

4. Apparatus for indicating and expediting work, comprising a linear support, and a number of pendent strings of indicators, arranged on said support in close succession and detachable therefrom, and all of the strings being in thrust-contact at the ends attached to the linear support, each string being built up of the same number of different indicators, each string representing a different subject-matter, and the indicators forming each string being readily visible as to the difference of their meaning.

5. Apparatus for indicating and expediting work, comprising a linear support, a number of pendent strings of indicators, arranged on said support in close succession and detachable therefrom, each string being built up of the same number of different indicators, each string representing a different subject-matter, and the indicators forming each string being readily visible as to the difference of their meaning, and a label affixed to each string and which bears all of the particulars of each job represented by the indicators of such string.

6. Apparatus for indicating and expediting work, comprising two supports, a supporting line secured to and between the supports, said line being inclined from the horizontal, a number of pendent strings of indicators arranged on the line in close succession and detachable therefrom, the inclination of the line enabling all of the strings of indicators to gravitate thereupon and to establish thrust-contact at their attached ends, each string being built up of the same number of different indicators, each string representing a different subject-matter, and the indicators forming each string being readily visible as to the difference of their meaning.

7. Apparatus for indicating and expediting work, comprising a pair of supports, a supporting-line for indicia on and between said supports, a series of hangers arranged to travel on said line in succession and in contact with each other, and a number of groups of co-related but diverse indicia-members hung on said series of hangers, each group representing a different subject matter from any other group, and all of said indicia-members facing laterally of the said line.

8. Apparatus for indicating and expediting work, comprising an aerial line, groups of co-related but diverse indicia-members suspended therefrom in succession, the indicia-members all facing away from one side or the other of the suspended groups, and several supporting means alongside of the series of groups of said members, over which the free ends of said groups may be hung.

9. Apparatus for indicating and expediting work, comprising an inclined aerial line, groups of co-related but diverse indicia-members suspended therefrom and adapted to travel thereon in succession, the indicia-members all facing away from one side or the other of the suspended groups, and supporting rails alongside of the series of groups of said members, over which the free ends of said groups may be hung.

10. Apparatus for indicating and expediting work, comprising a supporting-line for indicia-members, and a series of groups of co-related but diverse members hung and shiftable thereon in substantially one vertical plane, each group indicating a given subject matter, and each group having the same width as each of the other groups along said line, in combination with a scale arranged approximately parallel with said line, and being graduated in units of measurement corresponding with the width of each group or a multiple of said width.

11. Apparatus for indicating and expediting work, comprising an inclined, aerial, supporting-line for indicia-members, a series of hangers traveling freely on said line, a series of groups of co-related but diverse members supported by said hangers so as to depend from said line, in substantially one vertical plane, each group indicating a given subject matter, and each group having the same width as each of the other groups along said line, in combination with a scale arranged approximately parallel with said line but relatively to the suspended groups of said members, said scale being graduated in units of measurement corresponding with the width of each group.

12. Apparatus for indicating and expediting work, comprising an inclined, aerial, supporting-line for indicia-members, a series of hangers traveling freely on said line, a series of groups of co-rleated but diverse members supported by said hangers so as to depend from said line, in substantially one vertical plane, each group indicating a given subject matter, and each group having the same width as each of the other groups along said line, in combination with a scale arranged approximately parallel with said line but relatively to the suspended groups of said members, said scale being graduated in units of measurement corresponding with the width of each group, and supporting rails approximately parallel with said line and located laterally of the plane of said groups, for hanging the free ends of said groups of members thereover.

13. Apparatus for indicating and expediting work, comprising a median support, lateral supports below and to each side of it, and indicator-appendages strung along said median support so as to all face away from said median support for quick readability, and adapted to be trained over said lateral supports to one side or the other of said median support.

14. Apparatus for indicating and expediting work, comprising a median support, lateral supports, and indicator-appendages strung along said median support in contact with each other in the plane of their maximum widths so as to all face away from said median support, and adapted to be trained over said lateral supports to one side or the other of said median support.

15. Apparatus for indicating and expediting work, comprising a median support, lateral supports, and indicator-appendages strung along said median support and adapted to be trained over said lateral supports to one side or the other of said median support, each of said appendages comprising a group of mutually-engaged and detachable indicia-members, and all of said appendages having different characteristics.

16. Apparatus for indicating and expediting work, comprising a suspended trolley-line with a series of trolleys thereon, and which are removable laterally therefrom, and indicator-appendages carried by said trolleys, said line being slanted enough to balance the friction of the trolleys.

17. Apparatus for indicating and expediting work, comprising a trolley-line, trolleys thereon, said trolleys being removable laterally therefrom, and indicator-appendages carried by said trolleys, each trolley having thrust faces parallel with each other and with the thrust faces of the other trolleys.

18. Apparatus for indicating and expediting work, comprising a trolley-line, trolleys thereon, said trolleys being removable laterally therefrom, and indicator-appendages carried by said trolleys, each trolley having the same dimension longitudinally of said line as each of the other trolleys, the frames of all of said trolleys having contacting thrust-faces.

19. In apparatus of the character described, a line, means for exhibiting different subject matters thereon and comprising for each subject matter a group of different indicia-members, means for lengthening each group for one purpose, the lengths of corresponding indicia-members of the different groups being otherwise the same, indicator-sliders and collars for the groups, said means for exhibiting being shiftable along said line.

20. In apparatus of the character described, a line, means for exhibiting different subject matters thereon and comprising for each subject matter a group of different indicia-members, means for lengthening each group for one purpose, the lengths of corresponding indicia-members of the different groups being otherwise the same, indicator-sliders and collars for the groups, said means for exhibiting being shiftable along said line, and means for deflecting any number of said groups laterally.

21. Apparatus for indicating and expediting work, comprising a supporting way, a series of trolleys thereon and which are of exactly equal length along the way, indicia-members suspended by said trolleys, and a scale which is scaled to the unit of measurement of the said trolleys.

22. Apparatus for indicating and expediting work, comprising a supporting way, a series of abutting trolleys thereon and having their abutting faces at each end squared in the direction of travel on said way, whereby there is prevented the buckling or jamming of a long row of the trolleys when pushed or slid along said way, and indicia-members suspended by said trolleys.

23. Apparatus for indicating and expediting work, comprising a supporting way, a series of label holders of approximately the same widths and having means for suspending them in vertical position from said way, labels held by the holders and noting certain facts, and indicia-members suspended from said label holders to visually and physically represent such noted facts.

24. Apparatus for indicating and expediting work, comprising a supporting way, a series of trolleys on said way, labeled groups of indicia-members, and means for detachably connecting each labeled group with its own trolley and for enabling each group to be faced toward either side of the way without disturbing its trolley.

25. Apparatus for expediting and indicating work, comprising a linear support, trolleys thereon, successive groups of tangible, diverse, indicia-members assembled and suspended from said trolleys, other trolleys with markers for every one hundred of said groups, date trolleys which retain their relative positions on the line while traveling and indicate the number of weeks of elapsed time, or the age, and which are shiftable up the line one week, at the end of each week.

SCHUYLER S. WHEELER.